US012137333B2

(12) United States Patent
Hintennach et al.

(10) Patent No.: US 12,137,333 B2
(45) Date of Patent: Nov. 5, 2024

(54) ELECTRODYNAMIC ACTUATOR FOR A SPEAKER OR A SOUND TRANSDUCER WITH IMPROVED DAMPING

(71) Applicant: Sound Solutions International Co., Ltd., Beijing (CN)

(72) Inventors: Andreas Hintennach, Guntramsdorf (AT); Manuel Mefleh, Vienna (AT); Murat Polat, Vienna (AT); Gustav Otto, Vienna (AT); Patrick Gelbmann, Vienna (AT)

(73) Assignee: Sound Solutions International Co., Ltd., Beijing (CN)

(*) Notice: Subject to any disclaimer, the term of this patent is extended or adjusted under 35 U.S.C. 154(b) by 241 days.

(21) Appl. No.: 17/939,948

(22) Filed: Sep. 7, 2022

(65) Prior Publication Data

US 2023/0071811 A1 Mar. 9, 2023

(30) Foreign Application Priority Data

Sep. 9, 2021 (AT) .............................. A 50714/2021

(51) Int. Cl.

*H04R 25/00* (2006.01)
*H04R 7/04* (2006.01)
*H04R 9/02* (2006.01)
*H04R 9/06* (2006.01)

(52) U.S. Cl.

CPC ............. *H04R 7/045* (2013.01); *H04R 9/027* (2013.01); *H04R 9/06* (2013.01); *H04R 2440/05* (2013.01)

(58) Field of Classification Search

CPC .... H04R 2440/05; H04R 7/045; H04R 9/027; H04R 9/06; H04R 2400/07; H04R 9/025

USPC .......................................................... 381/423

See application file for complete search history.

(56) References Cited

U.S. PATENT DOCUMENTS

2007/0291976 A1 12/2007 Kajiwara
2014/0254191 A1 9/2014 Yasuike et al.
2020/0045466 A1 2/2020 Song et al.

FOREIGN PATENT DOCUMENTS

CN 207968942 U 12/2018
WO 2011104659 A2 2/2011

OTHER PUBLICATIONS

Austrian Patent Office; First Office Action issued in counterpart application A 50714/2021. Date of Office Action: Mar. 15, 2022.

*Primary Examiner* — Phylesha Dabney
(74) *Attorney, Agent, or Firm* — Dykema Gossett PLLC

(57) ABSTRACT

An electrodynamic actuator (1*a* . . . 1*c*) for a plate like structure (25) or membrane (2) is disclosed, which comprises a voice coil (7, 7*a*, 7*b*), a magnet system (8) and a plurality of arms (17*a* . . . 17*t*) coupling the voice coil (7, 7*a*, 7*b*) and the magnet system (8) in a movable manner. The arms (17*a* . . . 17*t*) are made of a metal with a fatigue strength of at least 370 N/mm$^2$ or an ultimate tensile strength of at least 1100 N/mm$^2$. Each of the arms (17*a* . . . 17*t*) comprises at least two arm sections (s, s1, s2), which are arranged movable to each other, and which are connected to each other by means of a damping material (18*a* . . . 18*g*) with a tensile storage modulus of 0.1-6000 MPa and a tensile loss factor of at least 0.1, each measured at room temperature of 20° C. Moreover the invention relates to speaker (5) and an electrodynamic transducer (26*a*, 26*b*) with such an electrodynamic actuator (1*a* . . . 1*c*) and a method of manufacturing an intermediate product for such an electrodynamic actuator (1*a* . . . 1*c*).

30 Claims, 12 Drawing Sheets

ELECTRODYNAMIC ACTUATOR FOR A SPEAKER OR A SOUND TRANSDUCER WITH IMPROVED DAMPING

PRIORITY

This patent application claims priority from Austrian Patent Application No. A50714/2021, filed on Sep. 9, 2021, the disclosure of which is incorporated herein, in its entirety, by reference.

BACKGROUND

The invention relates to an electrodynamic actuator, which is designed to be connected to a backside of a plate like structure or membrane opposite to a sound emanating surface of the plate like structure or the membrane and which comprises at least one voice coil, a magnet system and an arm arrangement of a plurality of arms. The voice coil has an electrical conductor in the shape of loops running around a coil axis in a loop section and the magnet system is designed to generate a magnetic field transverse to the conductor in the loop section. The arm arrangement couples the at least one voice coil and the magnet system and allows a relative movement between the voice coil and said magnet system in an excursion direction parallel to the coil axis. Alternatively, it couples the at least one voice coil and a movable part of the magnet system and allows a relative movement between the voice coil and said movable part of the magnet system in an excursion direction parallel to the coil axis.

The invention furthermore relates to a speaker, which comprises an electrodynamic actuator of the above kind and a membrane, which is fixed to the at least one coil and to the magnet system.

In addition, the invention relates to an electrodynamic (acoustic) transducer, which comprises a plate like structure with a sound emanating surface and a backside opposite to the sound emanating surface. The electrodynamic transducer additionally comprises an electrodynamic actuator of the above kind, which is connected to the plate like structure on said backside. In particular, the plate like structure can be embodied as a display. In this way, the electrodynamic actuator together with the display forms an output device (for both audio and video data).

Finally, the invention relates to a method of manufacturing an intermediate product for an electrodynamic actuator, wherein at least one voice coil and a magnet system of the above kind are provided, and an arm arrangement of the above kind is manufactured. Further on, the at least one voice coil is coupled to the magnet system by use of the arm arrangement allowing a relative movement between the voice coil and said magnet system in an excursion direction parallel to the coil axis. Alternatively, the at least one voice coil is coupled to a movable part of the magnet system by use of the arm arrangement allowing a relative movement between the voice coil and said movable part of the magnet system in an excursion direction parallel to the coil axis.

An electrodynamic actuator, speaker, transducer and method of the kind above are generally known. An electrical sound signal fed to the voice coil generates a force in the magnetic field of the magnet system and causes a movement between the coil arrangement and the magnet system or at least its movable part. In turn the membrane or plate like structure is deflected or moves according to the electric sound signal. As a consequence, sound corresponding to the electric sound signal is emanated from the sound emanating surface of the plate like structure or the membrane.

The ever increasing output power in relation to the size of the electrodynamic actuator puts comparably high demands on the arm arrangement because high excursions in relation to the size of the electrodynamic actuator cause comparably high bending stress in the arms of the arm arrangement. On the other hand, the arms shall cause a mechanical resistance (i.e. a force counteracting the force generated by the electrical sound signal) just as low as possible so that the efficiency of the electrodynamic actuator is kept high. Metals and in particular high-strength metals are materials, which in principle fulfill these requirements. Unfortunately, high-strength metals offer just a low and almost no damping. As a consequence, unwanted vibrations may occur in the arm arrangement which foil the acoustic performance and in particular the sound quality of a speaker or transducer. This is particularly true at the resonant frequency or frequencies of the arm arrangement. It should be noted at this point that even worse these vibrations are not necessarily linked to a high excursion of the sound emanating surface, but the arm arrangement may vibrate in itself with causing just a little excursion of the sound emanating surface. In simple words this means that energy and sound quality are destroyed at basically no outcome in very bad cases.

SUMMARY OF THE INVENTION

Thus, it is an object of the invention to overcome the drawbacks of the prior art and to provide a better electrodynamic actuator, a better speaker, a better electrodynamic transducer and a better manufacturing method. In particular, damping of the arm arrangement shall be improved while at the same time output power and/or efficiency are kept high.

The inventive problem is solved by an electromagnetic actuator as defined in the opening paragraph, wherein the arms are made of a metal with a fatigue strength of at least 370 $N/mm^2$ or an ultimate tensile strength of at least 1100 $N/mm^2$, and wherein each of the arms comprises at least two arm sections, which are arranged movable to each other and which are connected to each other by means of a damping material with a tensile storage modulus of 0.1-6000 MPa and a tensile loss factor of at least 0.1, each measured at room temperature of 20° C.

Moreover, the inventive problem is solved by a speaker, comprising an electrodynamic actuator of the above kind and a membrane, which is fixed to the at least one coil and to the magnet system.

In addition, the inventive problem is solved by an electrodynamic transducer, which comprises a plate like structure with a sound emanating surface and a backside opposite to the sound emanating surface and which comprises an electrodynamic actuator of the above kind being connected to said backside. Beneficially, the at least one voice coil or the magnet system of the electrodynamic actuator comprises a flat mounting surface, which is intended to be connected to the backside of the plate like structure opposite to a sound emanating surface of the plate like structure, wherein said backside is oriented perpendicularly to the coil axis. In particular, the plate like structure can be embodied as a display. In this way, the electrodynamic actuator together with the display forms an output device (for both audio and video data).

By the above measures, the damping of the arm arrangement is substantially improved while at the same time output power and/or efficiency are kept high. This is achieved by the special material mix of strong and even high-strength metals and a comparably soft damping material. By connecting at least two arm sections of an arm which can move relative to each other, the amplitude of a possible oscillation can substantially be reduced compared to arm arrangements without the proposed damping.

So, on the one hand, the arms can be made with very small to tiny cross sections so as to cause as little as possible mechanical resistance (i.e. a force counteracting the force generated by the electrical sound signal), but on the other hand, unwanted vibrations are substantially damped. In other words, arms made of very thin metal (metal foils) with the proposed damping have superior characteristics in the given application and beat the commonly used arrangements. Beneficially, the height of the cross section of the arm is in a range of 10 to 100 μm. Further on it is beneficial if a width of the cross section of the arm and in particular the metal core is in a range of 200 to 800 μm. Despite of their low thickness, these metals (metal foils) are very durable and because of their low thickness generate comparably low mechanical resistance. As a consequence, an electrodynamic transducer with the proposed technical features offers high output power at small size, high efficiency and high sound quality at the same time.

Beneficially, the arm and in particular the metal core can be made of or comprise steel, brass, bronze, molybdenum or tungsten. It is advantageous, if the arm is made of or comprises a stainless steel, and it is very advantageous if the arm and in particular is made of or comprises a cold-rolled stainless steel with a fatigue strength in a range of 370 to 670 $N/mm^2$ or an ultimate tensile strength in a range of 1100 to 2000 $N/mm^2$. Beneficially, austenitic stainless steel can be used for the arm, in particular stainless steel 1.4404. Austenitic stainless steels have a high share of austenite and as such are non-ferromagnetic or low-ferromagnetic. Accordingly no or just low (unwanted) forces are induced into the arms when they move in the magnetic field in the air gap of the magnet system. Such forces could shift the (dynamic) idle position of the electrodynamic actuator and deteriorate the characteristics of the electrodynamic actuator. Moreover, austenitic stainless steel does not or does not substantially magnetically bridge the air gap of the magnet system. In other words, the arms do not form magnetic short circuits in the magnet system. Furthermore, stainless steel, in addition to its characteristics presented before, provides the advantage that it is resistant against oxidation.

The "fatigue strength" (or endurance limit or fatigue limit), generally is the stress level below which an infinite number of loading cycles can be applied to a material without causing fatigue failure or inadmissible deformation. Above this stress level, fatigue failure or inadmissible deformation occurs in some point of time.

The "ultimate tensile strength" is the maximum stress that a material can withstand while being stretched or pulled before breaking (in case of a single load). The ultimate tensile strength, as a rule of thumb, is about three times the fatigue strength for metals.

One should note that referring to tensile stress is done for the reason of simplicity, and in reality a combined deformation of shear, compression and elongation may occur.

Using a metal for the arm arrangement has a further advantage. Beneficially, at least some of the arms of the arm arrangement can be electrically connected to the at least one voice coil. Accordingly, the arms can provide the function of electrically connecting the voice coil with fixed terminals, which in turn are used to connect the electrodynamic actuator to further circuitry, for example to a power amplifier. In that, the arms can draw the electrical sound signals and/or feedback signals, which can be used to measure characteristics of the electrodynamic actuator and further on to control the behavior of the electrodynamic actuator.

To improve the electrical function of the arms, a metal core of an arm may be coated with a metal with very good electrical conductivity. Beneficially, the at least one coating metal layer can comprise or consist of copper, silver, gold or aluminum.

In general, it is of advantage if the coating structure comprises an outer coating layer made of a polymer (e.g. a thermoplastics, a thermosetting plastic, an elastomer, silicone or rubber), which at least partly (and in particular entirely) covers the at least one arm.

Generally, the storage and loss modulus relate to the ratio of stress to strain of viscoelastic materials under vibratory conditions. The storage modulus (usually denoted with the character E') relates to the stored energy, representing the elastic portion of the viscoelastic material, and the loss modulus (usually denoted with the character E") relates to the energy dissipated as heat, representing the viscous portion of the viscoelastic material. The ratio of the loss modulus to the storage modulus is defined as the loss factor, which can also be written as tan δ if the storage modulus E' is seen as the real part of a complex modulus E* and the loss modulus E" is seen as the imaginary part of a complex modulus E*, wherein δ is the angle between the complex modulus E* and the real part E'. Accordingly, the complex modulus E* can be written as E*=E'+jE". Additionally, one should note that δ is not only the angle between the complex modulus E* and the real part E' but also the phase lag between stress and strain.

In the definition of claim 1, the tensile storage modulus and the tensile loss factor are used to define materials, which are suitable for the given application. One should note that this is done for the reason of simplicity, and in reality a combined deformation of shear, compression and elongation may occur. A tensile storage modulus of 0.1-6000 MPa is particularly related to plastics and for example, silicone has a loss factor of about 0.1.

The proposed measures in particular apply to "micro" electrodynamic actuators. The proposed measures also apply to speakers in general and particularly to micro speakers, whose membrane area is smaller than 600 $mm^2$ and/or whose back volume is in a range from 200 $mm^3$ to 2 $cm^3$. Such micro speakers are used in all kind of mobile devices such as mobile phones, mobile music devices, laptops and/or in headphones. It should be noted at this point, that a micro speaker does not necessarily comprise its own back volume but can use a space of a device, which the speaker is built into, as a back volume. That means, the speaker does not necessarily comprise its own (closed) housing but can comprise just an (open) frame. The back volume of the devices, which such speakers are built into, typically is smaller than 10 $cm^3$.

Moreover, a diameter of a metal core of the electrical conductor of the at least one voice coil of "micro" electrodynamic actuators beneficially is ≤110 μm. The electrical conductor can also comprise a (electrically insulating) coating on the metal core as the case may be.

Generally an "electrodynamic actuator" transforms electrical power into movement and force. An electrodynamic actuator together with a membrane forms a "speaker." An electrodynamic actuator together with a plate forms an "electrodynamic (acoustic) transducer." A special embodiment of a plate is a display. In this case, an electrodynamic actuator together with a display forms an "output device"

(for both audio and video data). Generally, a speaker, an electrodynamic transducer and an output device transform electrical power into sound.

It should be noted that sound can also emanate from the backside of the plate like structure and the membrane. However, this backside usually faces an interior space of a device (e.g. a mobile phone), which the speaker or output device is built into. Hence, the plate like structure or membrane may be considered to have the main sound emanating surface and a secondary sound emanating surface (i.e. said backside). Sound waves emanated by the main sound emanating surface directly reach the user's ear, whereas sound waves emanated by the secondary sound emanating surface do not directly reach the user's ear, but only indirectly via reflection or excitation of other surfaces of a housing the device, which the speaker or output device is built into.

A "movable part of the magnet system" in the context of the disclosure means a part of the magnet system which can move relatively to the at least one voice coil. Generally, a magnet system may have a fixed part, which is fixedly mounted to the voice coil or fixedly mounted in relation to the voice coil, and a movable part. It is also possible, that the whole magnet system is movable in relation to the at least one voice coil. In this case the movable part of the magnet system is the magnet system, and there is no fixed part.

The magnet system and/or the voice coil may be connected to or may be part of a housing or frame, and the arms can be connected to that housing or frame. So, the arms are not necessarily directly connected to the voice coil and the movable part of the magnet system but can be connected thereto indirectly as well.

An "arm arrangement" can also be seen as and termed as "spring arrangement," and an "arm" can be seen as and termed as "(spring) leg." In particular, the arrangement of a plurality of arms can be seen as a spring arrangement in case that the electrodynamic actuator is connected to a backside of a plate like structure and can be seen as a suspension system in case that the electrodynamic actuator is connected to a backside of a membrane.

The term "coupled" in the above sense both includes a direct connection between the at least one voice coil and the magnet system (particularly its movable part) by means of the arm arrangement as well as an indirect connection of the same via intermediate parts, which are fixedly arranged in relation to the at least one voice coil or the magnet system (particularly in relation its movable part). Such an intermediate part can be a frame, which the at least one voice coil or the magnet system (particularly its movable part) is attached to.

Further advantageous embodiments are disclosed in the claims and in the description as well as in the figures.

Beneficially, the arms comprise more than two arm sections, wherein each two of them are connected to each other by means of the damping material. In other words, not more than two arm sections are connected by means of a single drop or bridge of damping material in this embodiment. But of course there may be more than one drop or more than one bridge of damping material, which are spaced from each other, wherein each of them connects two arm sections. It should also be noted that two or more drops or two or more bridges of damping material can connect to a single arm section, provided that they each lead to different arm sections.

In one embodiment, the at least two arm sections run next to each other forming a longitudinal gap in-between, in which the damping material is arranged. In other words, the arm comprises at least two comparably long arm sections which run "in parallel" which in this context does not mean just straight arm sections, but in particular arm sections with a gap of constant width in-between independent of a particular course. These arm sections may move to each other at comparably high amplitudes. The damping material helps to keep this movement under control.

Beneficially, a ratio between a length of said gap to its width is >20. Accordingly, the gap is comparably narrow and the relative movement between the arm sections causes comparable high shear stress within the damping material and thus a comparable high damping.

In one embodiment, the at least two arm sections are arranged at a distance measured in the direction of the coil axis what means the width or height of the gap is measured in the direction of the coil axis. In other words the arm sections of the arm run above one other. Accordingly, the structure resulting thereof may be seen as sandwich structure.

Advantageously, a distance between the at least two arm sections being connected by means of the damping material is in a range of 5 μm≤d≤100 μm in the above embodiment. Experiments showed that damping is particularly efficient in this thickness range.

In another embodiment, the at least two arm sections are arranged at a distance measured perpendicularly to the direction of the coil axis what means the width of the gap is measured perpendicularly to the direction of the coil axis. In other words, the arm sections of the arm run side by side.

Advantageously, a distance between the at least two arm sections being connected by means of the damping material is in a range of 20 μm≤d≤100 μm in the above embodiment. Experiments showed that damping is particularly efficient in this distance range.

Beneficially, the gap is made by etching and/or by use of a laser (e.g. by use of a femtolaser). In this way, the gap can be manufactured with high accuracy despite it may be very narrow.

Beneficially, the arms are L-shaped, U-shaped, S-shaped, shaped like a bow or shaped like a meander when viewed in a direction parallel to the coil axis. In this way, the arms can be made comparably soft in a direction parallel to the coil axis, i.e. in the excursion direction. Accordingly, efficiency and acoustic power of the electrodynamic actuator are comparably high. It should be noted at this point that the meander or bow is not necessarily "round," but may also comprise, be made up or be approximated by straight segments. Accordingly, the straight segments can be concatenated by corners, or there can be arcs between the straight segments.

Beneficially, the at least two arm sections are concatenated in a longitudinal direction of the respective arm and alternatingly are bent in a different sense of direction or alternatingly are straight and bent (wherein adjacent bent arm sections can be bent in different senses of direction or have curvatures with different signs). Basically, structures with arm sections, which are alternatingly straight and bent, are L-shapes and U-shapes, and structures, which are alternatingly bent in a different sense of direction are S-shapes or meanders. Different senses of direction in the above context mean curvatures with different signs. In principle, one arm both can comprise a straight arm section adjacent to a bent arm section and an arm section bent in a first sense of direction adjacent to an arm section bent in a second sense of direction.

Generally, the proposed measures are not necessarily linked to narrow gaps filled with a damping material, but the damping material can also appear in the form of drops or bridges. This is particularly true if two arm sections shall be connected at a particular location.

Advantageously, a distance between the at least two arm sections being connected by means of a damping material, which is measured perpendicularly to the direction of the coil axis, is in a range of 50 μm≤d≤400 μm in the above embodiment. During experiments it turned out that damping is particularly efficient in this distance range.

In one further beneficial embodiment, the at least two arm sections can consist of different materials. In this way, the vibration behavior of an arm can be set in wide ranges. For example, a first arm section can be made of a first metal (e.g. steel), whereas a second arm section is made of a second metal (e.g. copper or aluminum).

In another embodiment, the arms are coated. In this way, the metal of the arms can be protected from unfavorable environmental conditions and in particular from oxidation. In particular, a material being different from the damping material can be used for a coating. For example, lacquer can be applied to the arms, in particular before they are connected by means of the damping material.

In yet another advantageous embodiment, the arms are coated with the damping material. Here, the damping material is applied to the arms which then also connects the arm sections of the arms based on cohesion. So, connection of the arm sections as well as coating the same can take place in one and the same process. However, in principle it is also possible that in a first step the arms are coated with the damping material and in a second step the coated arm sections are connected with the damping material. In particular, the coating on the arm sections may act as a bonding agent in this case.

In a very advantageous embodiment, the at least one of the plurality of arms is encompassed by or embedded in the damping material (when viewed into a direction parallel to the coil axis). So, the damping material forms a kind of a plate or a film, which the metal arms are embedded in. Such an arrangement is comparably easy to produce and provides substantial damping to the arms. To allow ventilation of an interior volume or interior space between by the platelike or a filmlike damping material and the plate like structure or membrane, ducts may lead into said interior volume or interior space. For example, said ducts may be arranged in the magnet system, in a housing or in a frame of the electrodynamic actuator. Recesses in the platelike or a filmlike damping material may allow ventilation as well. In this way, a pressure compensation is possible between said interior volume or interior space and a space outside of the electrodynamic actuator what can improve acoustic performance of the electrodynamic actuator. Nevertheless, it is also possible that no ducts or recesses are provided and that said interior volume or interior space is airtight. In this way, dust and foreign particles can be kept away from the air gap and away from the moving parts of the electrodynamic actuator. Accordingly, failure free operation of the electrodynamic actuator over a long time can be achieved.

Advantageously, a thickness of the damping material, which is measured in the direction of the coil axis, is in a range of 20 μm≤d≤200 μm in the above embodiment. During experiments it turned out that surprisingly already comparably thin damping layers having a thickness of just 20 μm≤d≤200 μm substantially contribute to damping of the arms, although the metal used for the arms offers just a low or almost no damping. This is especially true if steel is used for the arms. It is even possible to obtain a substantial damping in an advantageous thickness range of 20 μm≤d≤80 μm. While a substantial improvement of damping is not expected over 80 μm, thicker damping layers may offer a better lifetime.

It is particularly advantageous, if the coating consists of or contains sprayed silicone. In other words, the coating is applied by spraying silicone. In this context, an advantageous method of manufacturing an intermediate product for an electrodynamic actuator is proposed, comprising the steps:

- providing at least one voice coil, which has an electrical conductor in the shape of loops running around a coil axis in a loop section,
- providing a magnet system, which is designed to generate a magnetic field transverse to the conductor in the loop section,
- manufacturing an arm arrangement of a plurality of arms, wherein
  - the arms are made of a metal with a fatigue strength of at least 370 N/mm$^2$ or an ultimate tensile strength of at least 1100 N/mm$^2$ and wherein
  - the arms are L-shaped, U-shaped, S-shaped, shaped like a bow or shaped like a meander when viewed into a direction parallel to the coil axis,
- embedding at least one of the plurality of arms in silicone, which is sprayed onto the at least one of the plurality of arms and which forms a damping material for the at least one of the plurality of arms, and
- coupling the at least one voice coil and
  - a) the magnet system and allowing a relative movement between the voice coil and said magnet system in an excursion direction parallel to the coil axis or
  - b) a movable part of the magnet system and allowing a relative movement between the voice coil and said movable part of the magnet system in an excursion direction parallel to the coil axis.

Spraying silicone in particular qualifies for high production speeds and thus for application in the production of electrodynamic actuators with high volumes. For example, the liquid silicone may be pressed out of one or more nozzles for the manufacturing process of the embedded arm arrangement. It should also be noted that the intermediate product at least comprises the parts indicated above but can comprise more parts of an electrodynamic actuator as the case may be, for example, a frame or a housing. It should also be noted that provision of the voice coil and/or the magnet system may include manufacturing the same. However, it is also possible to obtain ready to use parts from a third party in this context.

In another beneficial embodiment, the arms together with the damping material are coated (with a material different from the damping material). For example, lacquer can be applied to the above arrangement. So, the arms are first connected by means of the damping material, and then the resulting structure is coated with a different second material.

Advantageously, the at least two arm sections can have a different stiffness. In other words, a kind of asymmetry is introduced which helps to set the vibration behavior in wide ranges. For example, one arm section may have a larger cross section than another arm section. Alternatively or in addition, a first arm section can be made of a first metal (e.g. steel), whereas a second arm section is made of a second metal (e.g. copper or aluminum).

Beneficially, an average sound pressure level of the speaker or the electrodynamic transducer (or the output device) measured in an orthogonal distance of 10 cm from the sound emanating surface is at least 50 dB_SPL in a frequency range from 100 Hz to 15 kHz. "Average sound pressure level $SPL_{AVG}$" in general means the integral of the sound pressure level SPL over a particular frequency range divided by said frequency range. In the above context, in detail the ratio between the sound pressure level SPL integrated over a frequency range from f=100 Hz to f=15 kHz and the frequency range from f=100 Hz to f=15 kHz is meant. In particular, the above average sound pressure level is measured at 1 W electrical power more particularly at the nominal impedance. The unit "dB_SPL" generally denotes the sound pressure level relative to the threshold of audibility, which is 20 μPa.

BRIEF DESCRIPTION OF THE DRAWINGS

These and other aspects, features, details, utilities, and advantages of the invention will become more fully apparent from the following detailed description, appended claims, and accompanying drawings, wherein the drawings illustrate features in accordance with exemplary embodiments of the invention, and wherein:

FIG. 11 an oblique view of an arrangement with arm sections running side by side with a damping material in-between.

FIG. 13 an oblique view of an arrangement with arm sections running above one another with a damping material in-between.

Like reference numbers refer to like or equivalent parts in the several views.

DETAILED DESCRIPTION OF EMBODIMENTS

Figure 1:
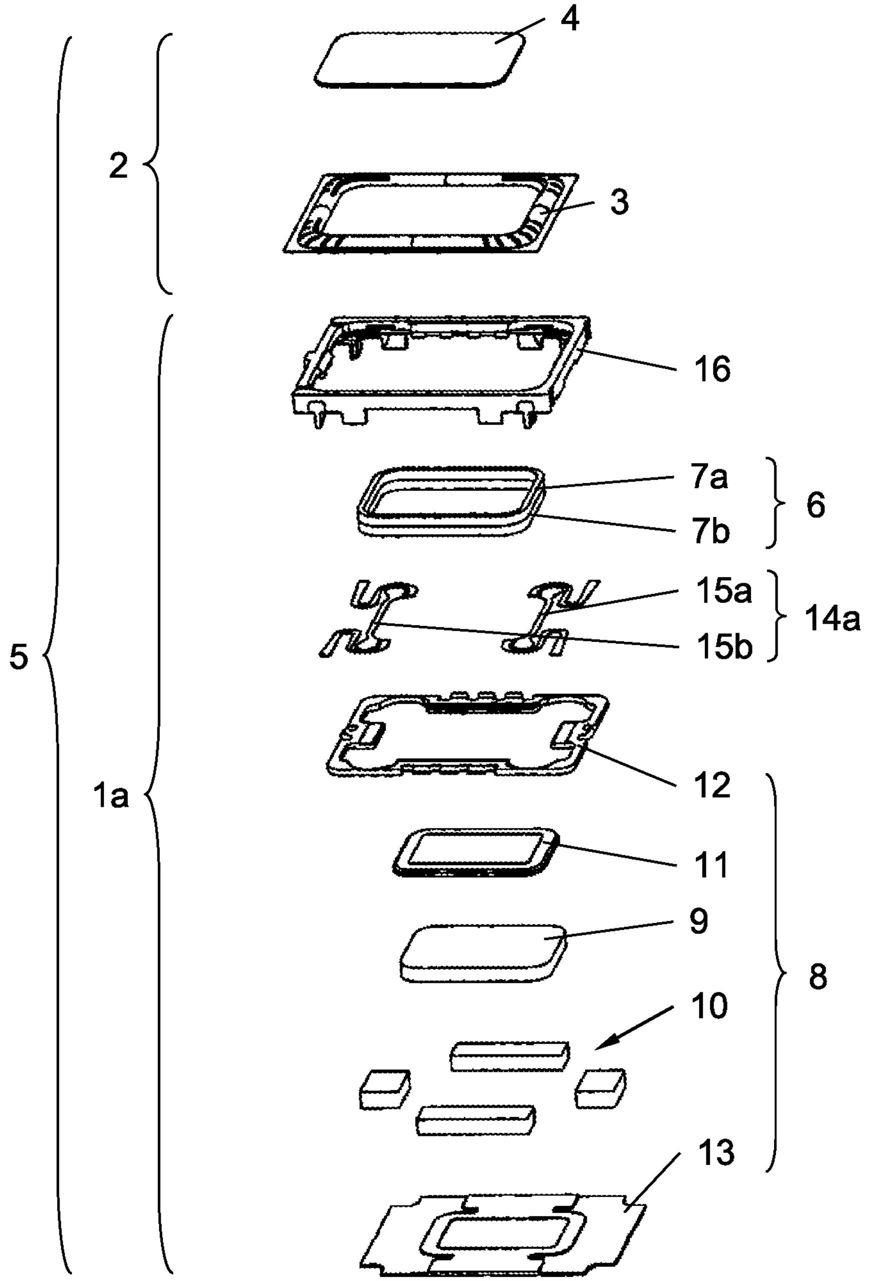
FIG. 1 shows an example of a speaker with an electromagnetic actuator in exploded view.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

All directional references (e.g., "plus," "minus," "upper," "lower," "upward," "downward," "left," "right," "leftward," "rightward," "front," "rear," "top," "bottom," "over," "under," "above," "below," "vertical," "horizontal," "clockwise," and "counterclockwise") are only used for identification purposes to aid the reader's understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., "attached," "coupled," "connected," and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

All numbers expressing measurements and so forth used in the specification and claims are to be understood as being modified in all instances by the term "about" or "substantially," which particularly means a deviation of ±10% from a reference value.

Figure 2:
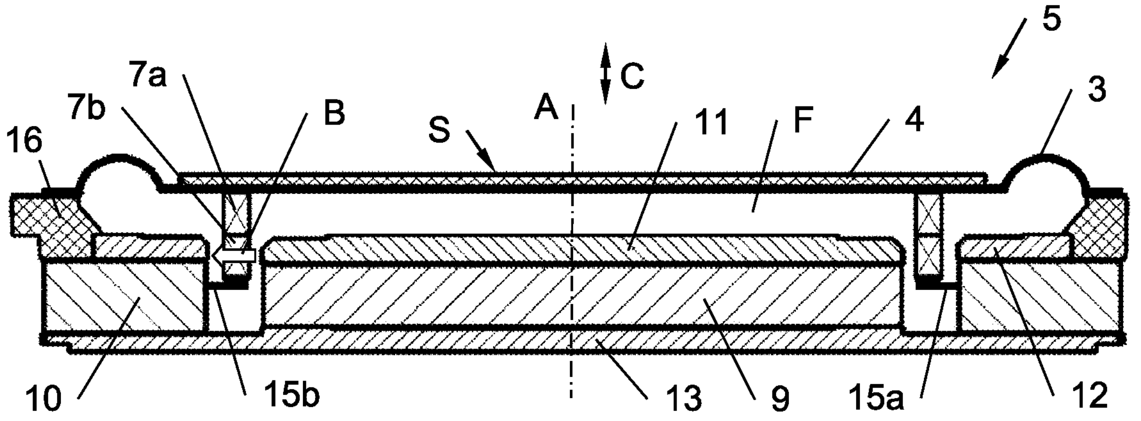
FIG. 2 shows the speaker of FIG. 1 in sectional view.
Figure 3:
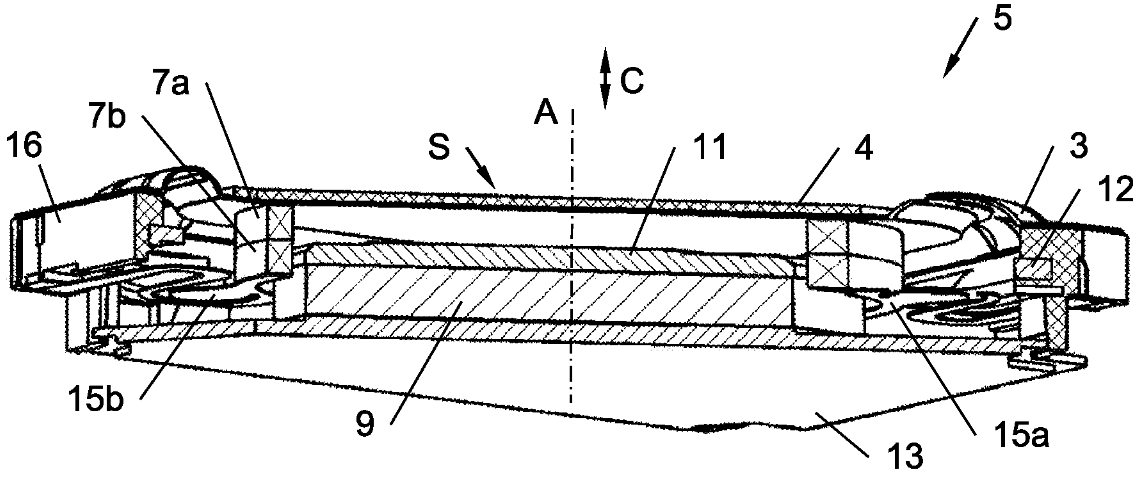
FIG. 3 shows an angular cross sectional view of the speaker of FIG. 1 from below.

An example of an electrodynamic actuator 1*a* is disclosed by use of the FIGS. 1 to 3. FIG. 1 shows an exploded view of the electrodynamic actuator 1*a*, FIG. 2 shows a cross sectional view of the electromagnetic actuator 1*a*, and FIG. 3 shows an angular cross sectional view of the electromagnetic actuator 1*a* from below.

Generally, the electromagnetic actuator 1*a* is designed to be connected to a backside of a plate like structure or membrane opposite to a sound emanating surface S of the plate like structure or the membrane. In the example shown in FIGS. 1 to 3, the electromagnetic actuator 1*a* is connected to a backside of a membrane 2. The membrane 2 in this example comprises a flexible membrane part 3 and a rigid membrane part 4 in the shape of a plate. However, the rigid membrane part 4 is just optionally and may be omitted. The electromagnetic actuator 1*a* together with the membrane 2 forms a speaker 5. So, in principle, FIG. 1 shows an exploded view of the speaker 5, FIG. 2 shows a cross sectional view of the speaker 5, and FIG. 3 shows an angular cross sectional view of the speaker 5 from below.

The electromagnetic actuator 1*a* has an annular coil arrangement 6, which in this example comprises a first voice coil 7*a* and a second voice coil 7*b* stacked above another and connected to each other by means of a glue layer. However, it is also possible that the electromagnetic actuator 1*a* comprises just one voice coil 7*a*. In any case, a voice coil 7*a*, 7*b* has an electrical conductor in the shape of loops running around a coil axis (or actuator axis) A in a loop section. For example, a diameter of a metal core of the electrical conductor of the voice coils 7*a*, 7*b* can be ≤110 μm and/or the electrical conductor can also comprise an (electrically insulating) coating on the metal core.

The electromagnetic actuator 1*a* furthermore comprises a magnet system 8, which in this example comprises a center magnet 9 and outer magnets 10 as well as a center top plate 11 from soft iron, an outer top plate 12 from soft iron and a bottom plate 13 from soft iron. The center magnet 9 is mounted to the bottom plate 13 and to the center top plate 11, and the outer magnets 10 are mounted to the bottom plate 13 and to the outer top plate 12. The magnet system 8 generally is designed to generate a magnetic field B transverse to a longitudinal direction of the electrical conductor of the annular coil arrangement 6 wound around the coil axis (or actuator axis) A in the loop section.

Moreover, the electromagnetic actuator 1*a* comprises an arm arrangement 14, which generally comprises of a plurality of arms (or legs or levers) connecting the coil arrangement 6 and the magnet system 8 and which allows a relative movement between the coil arrangement 6 and said magnet system 8 in an excursion direction C parallel to the coil axis A. In this example, the arm arrangement 14 comprises two arm sub arrangements 15*a*, 15*b* each having two arms (see FIGS. 6 and 7 for more details).

Finally, the electromagnetic actuator 1*a* comprises a frame 16, to which the membrane 2 (in detail its flexible membrane part 3), the outer magnets 10, the outer top plate 12 and the bottom plate 13 are mounted. However, the frame 16 may be shaped different than depicted and may hold together a different set of parts. For example, it may be connected only to the outer magnets 10 or to the outer top plate 12. It should also be noted that the arm arrangement 14 does not necessarily connect the coil arrangement 6 and the magnet system 8 directly, but it may also connect them (indirectly) via the frame 16 for example.

Figure 4:
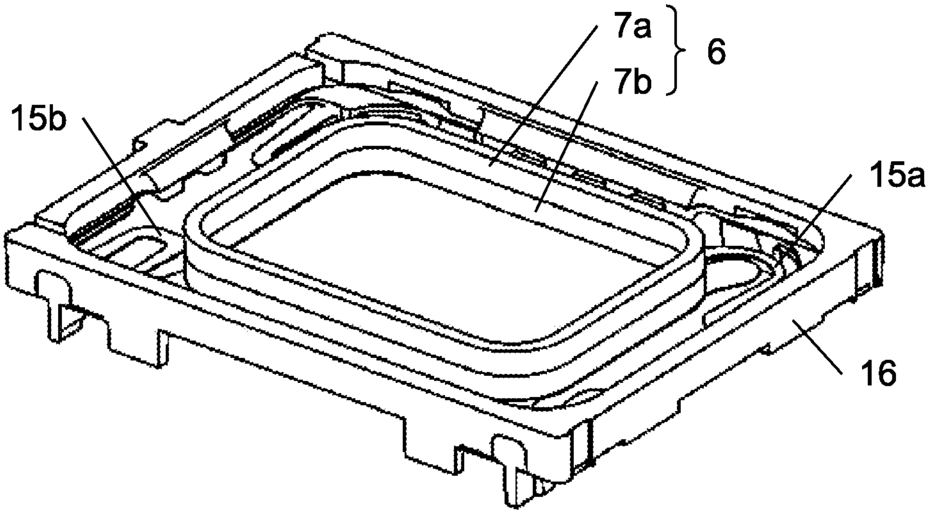
FIG. 4 shows the coil arrangement, the arm arrangement and the frame separated from the remaining parts of the speaker in angular view from above.
Figure 5:
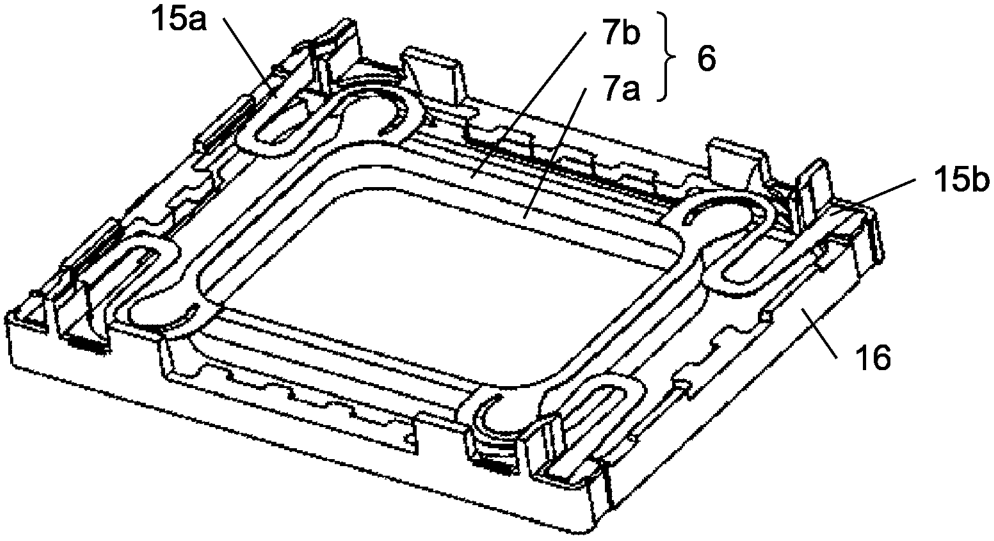
FIG. 5 shows the arrangement of FIG. 4 in angular view from below.

FIGS. 4 and 5 show the coil arrangement 6, the arm arrangement 14 and the frame 16 separated from the remaining parts of the speaker 5. FIG. 4 shows said arrangement in angular view from above, and FIG. 5 shows the arrangement in angular view from below, wherein the arrangement is flipped around its horizontal axis.

Figure 6:
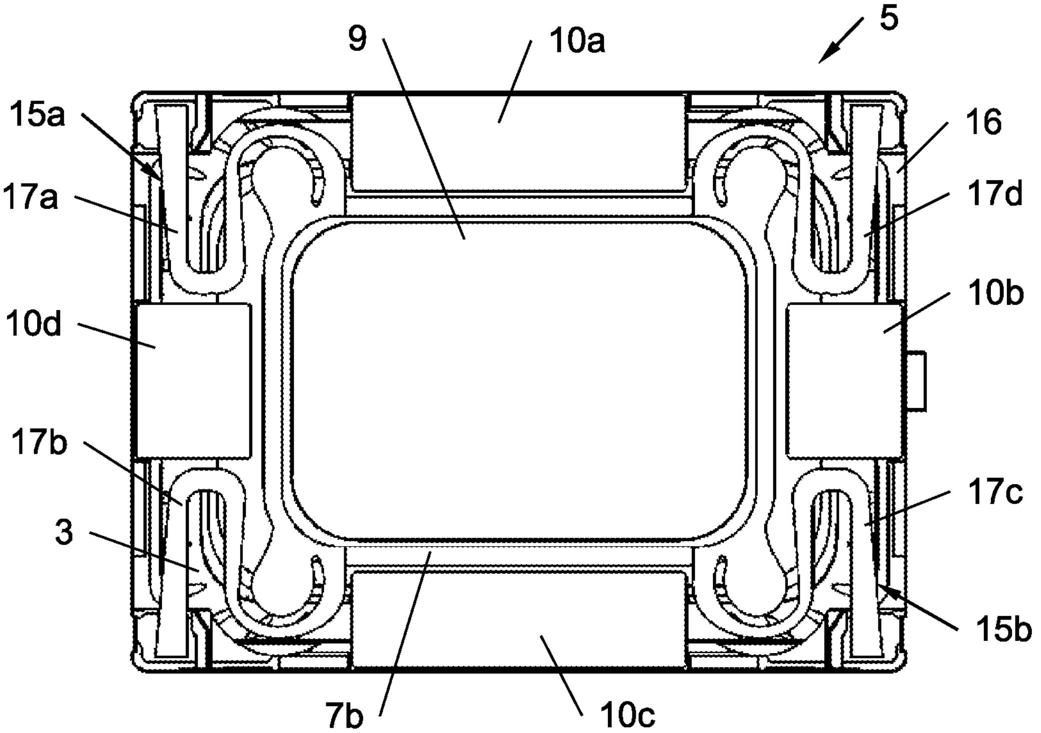
FIG. 6 shows a bottom view of the speaker with the bottom plate taken off.
Figure 7:
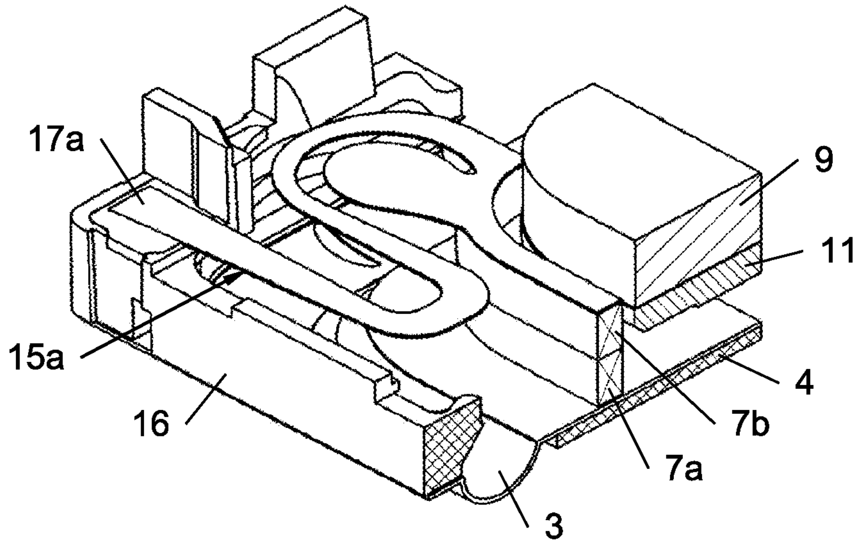
FIG. 7 shows a detailed angular view of the speaker from below with the bottom plate taken off and focused to the first arm sub arrangement.

Further on, FIG. 6 shows a bottom view of the speaker 5 with the bottom plate 13 taken off and FIG. 7 shows a detailed angular view of the speaker 5 from below with the bottom plate 13 taken off and focused to the first arm sub arrangement 15*a*. In FIGS. 6 and 7 the arms 17*a* . . . 17*d* of the arm arrangement 14 are explicitly referenced with reference signs.

Generally, the arms 17*a* . . . 17*d* of the arm arrangement 14 are made of a metal with a fatigue strength of at least 370 $N/mm^2$ or an ultimate tensile strength of at least 1100 $N/mm^2$ and generally, each of the arms 17*a* . . . 17*d* comprises at least two arm sections, which are arranged movable to each other and which are connected to each other by means of a damping material with a tensile storage modulus of 0.1-6000 MPa and a tensile loss factor of at least 0.1, each measured at room temperature of 20° C.

In FIGS. 1 to 7 no damping material connecting arm sections of the arms 17*a* . . . 17*d* of the arm arrangement 14 is explicitly shown, but this is shown now in more detail by reference of FIGS. 8 to 13. Accordingly, the technical teaching of the FIGS. 8 to 13 can similarly be applied to the arm arrangement 14 of FIGS. 1 to 7.

Figure 8:
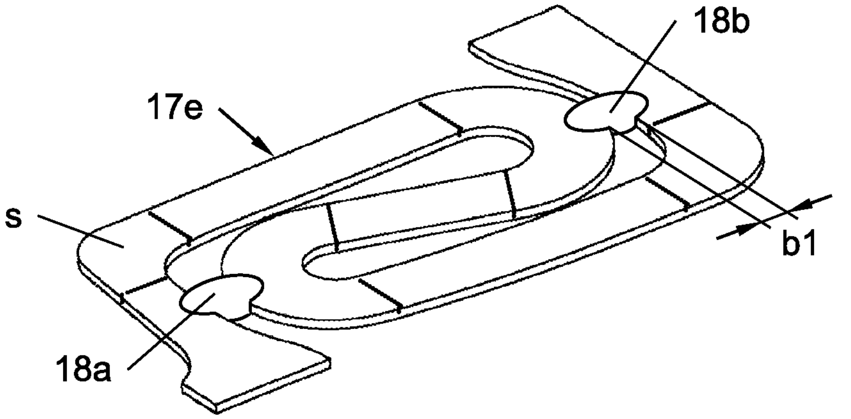
FIG. 8 shows an oblique view of an arrangement with a meander arm with two drops or bridges of damping material.

FIG. 8 shows an oblique view of an arrangement with an arm 17*e*, which is very similar to the arms 17*a* . . . 17*d* depicted in FIGS. 1 to 7. 10. Like the arms 17*a* . . . 17*d*, the arm 17*e* is shaped like a meander when viewed in a direction parallel to the coil axis A. As is visible in FIG. 8, the arm 17*e* comprises concatenated arm sections s in a longitudinal direction of the arm 17*e*, which alternatingly are straight and bent and have different curvatures.

Figure 10:
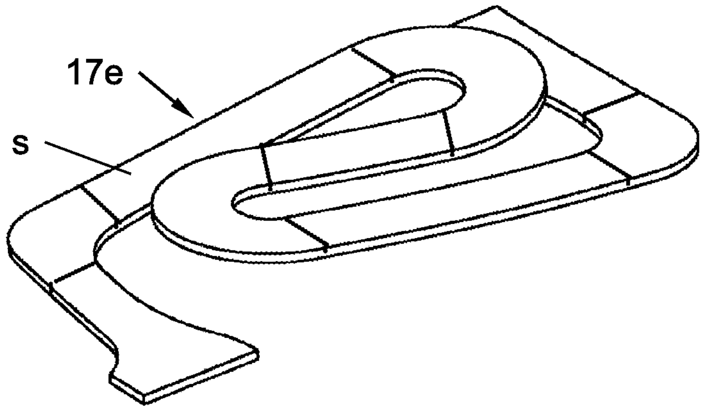
FIG. 10 shows how the arrangement of FIG. 8 or 9 would move without a damping material.

FIG. 8 moreover shows drops or bridges 18*a*, 18*b* of a damping material, each of which connects two different arm sections s of the arm 17*e*, which arm sections s are arranged movable to each other (see also FIG. 10 in this context). A distance b1 between the connected arm sections s measured perpendicularly to the direction of the coil axis A preferably is in a range of 50 μm≤d≤400 μm. In this way, a movement between arm sections s can substantially be damped by the given material.

Figure 9:
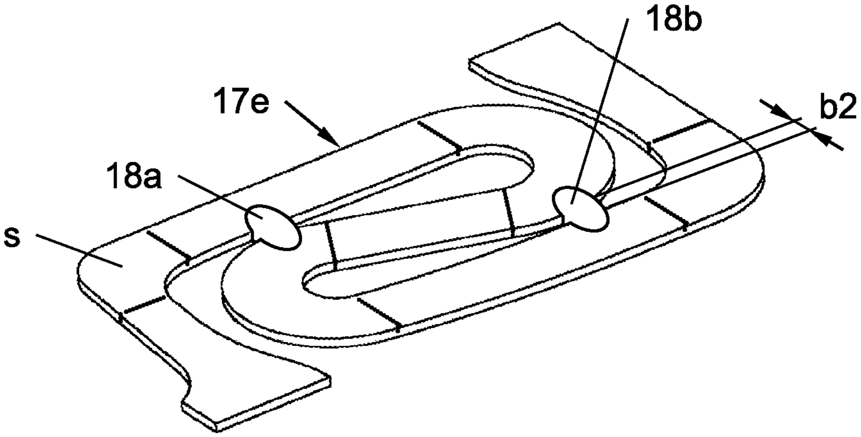
FIG. 9 like FIG. 8, but with the drops or bridges at a different location.

FIG. 9 shows an oblique view of an arrangement, which is similar to the arrangement shown in FIG. 8. In contrast, the drops or bridges 18*a*, 18*b* of a damping material are arranged at different locations and connect different arm sections s of the arm 17*e*. However, the teaching disclosed hereinbefore in view of FIG. 8 can similarly applied to the arrangement of FIG. 9, in particular the teaching with regards to the distance b2 between the connected arm sections s, which again preferably can be in a range of 50 μm≤d≤400 μm.

FIG. 10 shows how the arm sections s of the arm 17*e* may move relative to each other when the coil arrangement 6 is excursed. To improve visibility, the arm 17*e* is shown without drops or bridges 18*a*, 18*b* of a damping material in FIG. 10. However, in reality, the drops or bridges 18*a*, 18*b* of a damping material for example can be located as indicated in FIGS. 8 and 9 and damp the relative movement between the arm sections s of the arm 17*e*.

Figure 11:
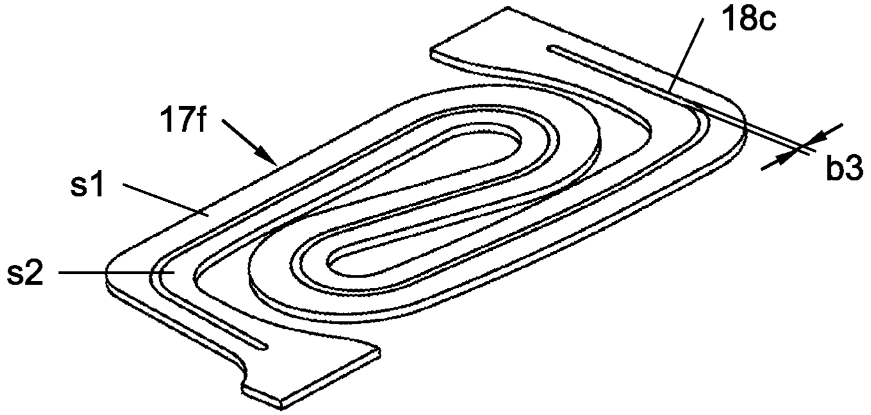

FIG. 11 shows an alternative embodiment of an arm 17*f* which has two arm sections s1, s2 running next to each other with a slit in-between in a longitudinal extension of the arm 17*f*. In the slit, a damping material 18*c* is arranged. Preferably, the distance b3 between the two arm sections s1, s2 connected by the damping material 18*c* measured perpendicularly to the direction of the coil axis A is in a range of 20 μm≤d≤100 μm. In this way, a movement between arm sections s1, s2 can substantially be damped by the given material, too.

Figure 12:
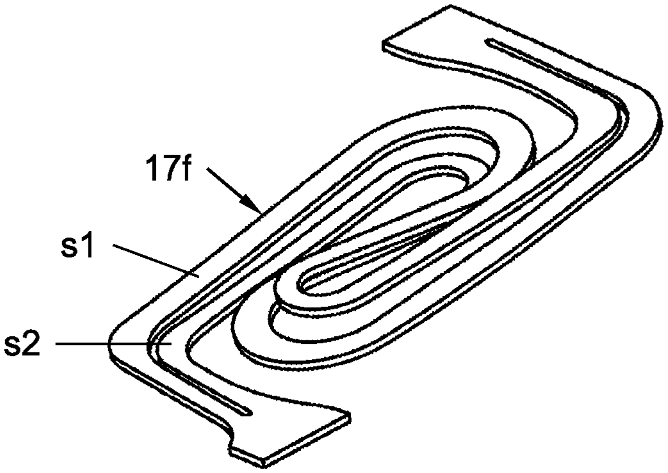
FIG. 12 shows how the arrangement of FIG. 11 would move without a damping material.

FIG. 12 shows how the arm sections s1, s2 of the arm 17*f* may move relative to each other when the coil arrangement 6 is excursed. To improve visibility, the arm 17*f* again is shown without a damping material 18*c* in FIG. 12, but one easy understands that the damping material 18*c* damps the relative movement between the arm sections s1, s2 of the arm 17*f*.

Figure 13:
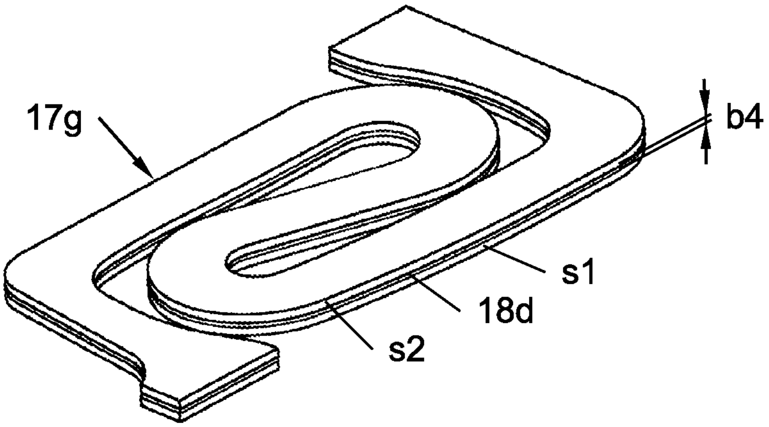

FIG. 13 shows yet another alternative embodiment of an arm 17*g*, which has two arm sections s1, s2 running above one another other with a slit in-between in a longitudinal extension of the arm 17*g*. In the slit, a damping material 18*d* is arranged. Preferably, the distance b4 between the two arm sections s1, s2 connected by the damping material 18*c* measured in the direction of the coil axis A is in a range of 5 μm≤d≤100 μm. In this way, a movement between arm sections s1, s2 can substantially be damped by the given material as well. Because of its structure, the arrangement shown in FIG. 12 may be seen as and denoted as "sandwich."

In the FIGS. 8 to 13, each two of the arm sections s . . . s2 are connected to each other by means of the damping material 18*a* . . . 18*d*. In this way, the damping effect can be set or chosen in differentiated way. Nevertheless it is also possible that the damping material 18*a* . . . 18*d* connects more than two arm sections s . . . s2 (see for example FIG. 17 in this context).

In the examples of FIGS. 11 to 13, a ratio between a length of said gap to its width can be above 20 meaning that the gap is comparably small. Accordingly, a relative movement between the arm sections s1, s2 causes comparable high shear stress within the damping material 18*c*, 18*d* and thus a comparable high damping.

In one embodiment, the at least two arm sections s . . . s2 can have a different stiffness and/or consist of different materials. For example, one arm section s1 may have a larger cross section than another arm section s2. Alternatively or in addition, the first arm section s1 can be made of a first metal (e.g. steel), whereas the second arm section s2 is made of a second metal (e.g. copper or aluminum). By these measures, a kind of asymmetry can be introduced which helps to set the vibration behavior in wide ranges.

Figure 14:
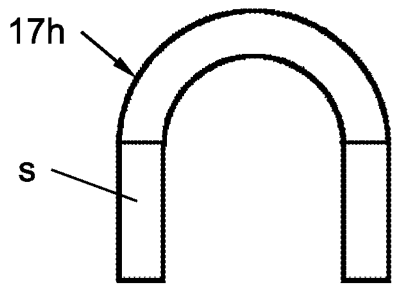
FIG. 14 shows a top view of an exemplary U-shaped arm.
Figure 15:
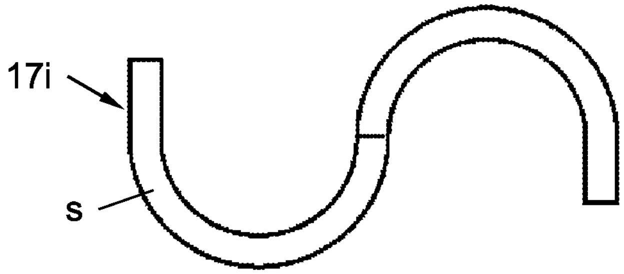
FIG. 15 shows a top view of an exemplary S-shaped arm.
Figure 16:
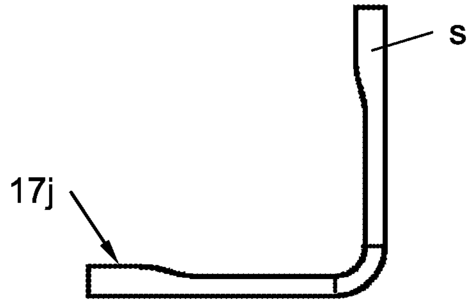
FIG. 16 shows a top view of an exemplary L-shaped arm.

FIGS. 14 to 16 now show further alternative shapes of arms 17*h* . . . 17*j* in top view. In detail, FIG. 14 shows an U-shaped arm 17*h*, FIG. 15 shows an S-shaped arm 17*i* (having arm sections s alternatingly bent in a different sense of direction) and FIG. 16 shows an L-shaped arm 17*j*. In FIGS. 14 to 16, a damping material 18*a* . . . 18*d* is not explicitly shown, but one easily understands that the arms 17*h* . . . 17*j* of FIGS. 14 to 16 may be damped by a damping material 18*a* . . . 18*d* as outlined with respect to FIGS. 9 to 13.

In view of FIG. 15 it should also be noted that a clear differentiation between S-shapes and meanders may be difficult. However, a meander in particular may result out of an S-shape when the angle of the bows reaches over 180°. A similar consideration can be made in view of bow shapes L-shapes and U-shapes. An U-shape in particular can be seen as a bow shape with an angle of about 180° and an L-shape in particular can be seen as a bow shape with an angle of about 90°.

Figure 17:
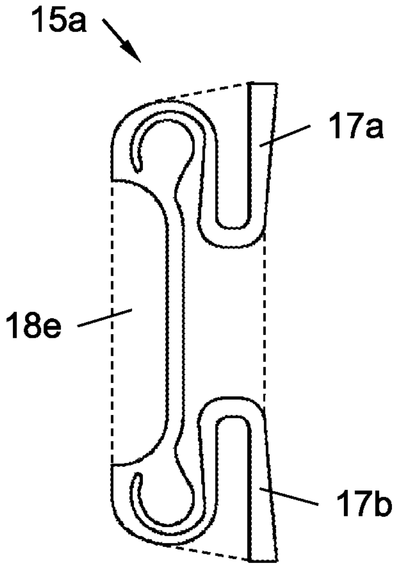
FIG. 17 shows a top view of an arm arrangement like it is used in the electromagnetic actuator of FIGS. 1 to 7 embedded in a damping material.
Figure 18:
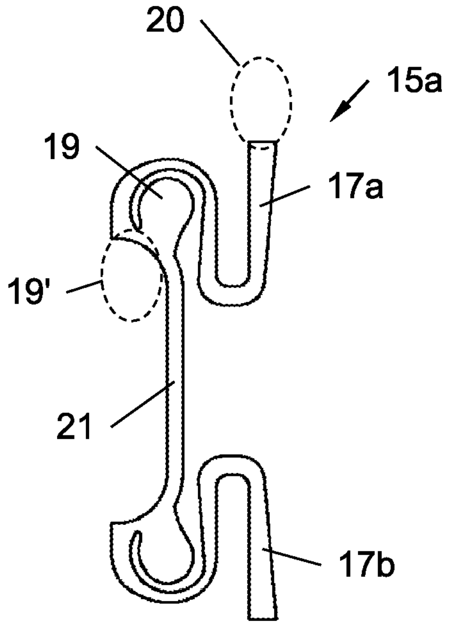
FIG. 18 shows a top view of an arm arrangement of FIG. 17 with variations of contact pads.
Figure 19:
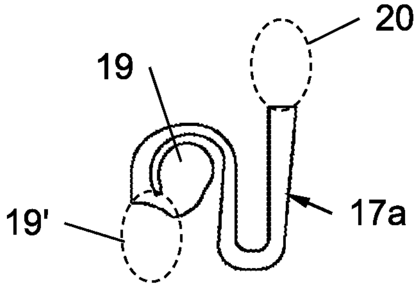
FIG. 19 shows a top view of a single arm with variations of contact pads.

FIGS. 17 to 19 show further examples, which are basically based on the arms 17*a* . . . 17*d* of the speaker 5 disclosed in FIGS. 1 to 7.

FIG. 17 shows a sub arrangement 15*a* of the speaker 5 in isolated top view. Dashed lines indicate a further embodiment of the proposed damping feature. In detail, the arms 17*a*, 17*b* are encompassed by or embedded in the damping material 18*e* which is particularly visible when viewed into a direction parallel to the coil axis A (see dashed lines). So, the damping material 18*e* forms a kind of a plate or a film. A thickness of the damping material 18*e*, which is measured in the direction of the coil axis A preferably is in a range of 20 μm≤d≤200 μm. In an even more preferred embodiment, the thickness of the damping material 18*e* is in a range of 20 μm≤d≤80 μm. Already comparably thin damping layers 18*e* substantially contribute to damping of the arms 17*a*, 17*b*, although the metal used for the arms 17*a*, 17*b* offers just a low or almost no damping. This is especially true if steel is used for the arms 17*a*, 17*b*. While a substantial improvement of damping is not expected over 80 μm, thicker damping layers 18*e* may offer a better lifetime.

If the whole arm arrangement 14 is embedded in the damping material 18*e*, an interior volume or interior space between by the platelike or a filmlike damping material 18*e* and the membrane 2 (or a plate like structure as the case may be—see FIGS. 32 and 33 in this context) may be sealed airtightly. In this way, dust and foreign particles can be kept away from the air gap and away from the moving parts of the electrodynamic actuator 1*a*. Accordingly, failure free operation of the electrodynamic actuator 1*a* over a long time can be achieved.

Nonetheless, it is also possible to allow ventilation of said interior volume or interior space. For this reason, ducts may be arranged in the magnet system 8, in the frame 16 (or a housing as the case may be) and may lead into said interior volume or interior space. Recesses in the platelike or a filmlike damping material 18*e* may allow said ventilation as well. In this way, a pressure compensation is possible between said interior volume or interior space and a space outside of the electrodynamic actuator 1*a* what can improve acoustic performance of the electrodynamic actuator 1*a*.

FIG. 18 shows an alternative example of a sub arrangement 15*a*. Generally, as said before, the arms 17*a*, 17*b* are used to mechanically connect the coil arrangement 6 and the magnet system 8. Accordingly, the outer connecting section mechanically connects the arms 17*a*, 17*b* to the frame 16 and the inner connecting section mechanically connects the arms 17*a*, 17*b* to the coil arrangement 6. In addition, the arms 17*a*, 17*b* can also be used to electrically connect the coil arrangement 6. In this case, the arms 17*a*, 17*b* have both a mechanical function and an electrical function. An optional inner contacting pad 19 can be used to electrically connect the coil arrangement 6 to the arm 17*a*, but it is also possible to use the inner connecting section for this reason. In this case, the inner connecting section has both a mechanical and an electrical function. The very same counts for the outer connecting section, which may have both a mechanical and an electrical function, too. It is also possible, that the arm 17*a* comprises an additional outer contacting pad 20 (drawn with a dashed line).

In the example of FIGS. 17 and 18, the inner contacting pad 19 is arranged within the inner bow. In this way, the area of the inner contacting pad 19 is relatively large so that the coil arrangement 6 can be connected to the arm 17*a* reliably (e.g. by soldering, welding or gluing). Nevertheless, just little space is needed in total for the connection of the magnet system 8 and the coil arrangement 6. In other words, the inner contacting pad 19 is no cause for an increased air gap between the magnet system 8 and the coil arrangement 6, and hence efficiency and power of the speaker 5 are comparably high. It should be noted that the very same technical teaching with the very same advantages can be applied to the outer contacting pad 20. Beneficially, it can be arranged within the outer bow. Despite of the advantages disclosed above, the inner contacting pad 19' may also be arranged out of the inner bow 20 (drawn with a dashed line).

FIGS. 17 and 18 also shows that the arms 17*a*, 17*b* are connected by an arm bridge 21 thus forming the first arm sub arrangement 15*a*. The arm bridge 21 can have both a mechanical and an electrical function as the case may be.

It should be noted at this point that the meander is not necessarily "round," but may also comprise, be made up or be approximated by straight segments as this is the case in FIGS. 17 and 18. In this example, the straight segments are concatenated by round bows, however, the straight segments can also be concatenated by corners. Instead of the straight segments of FIG. 18 also round shapes may be used. In other words, the term "meander" is to be interpreted widely in this disclosure.

In the example of FIGS. 17 and 18 two arms 17*a*, 17*b* are connected by the arm bridge 21, but this is no necessary condition. The coil arrangement 6 can be connected to the magnet system 8 also by a number of separate arms 17*a*, 17*b*. An example of such a separate arm 17*a* is depicted in FIG. 19.

Figure 20:
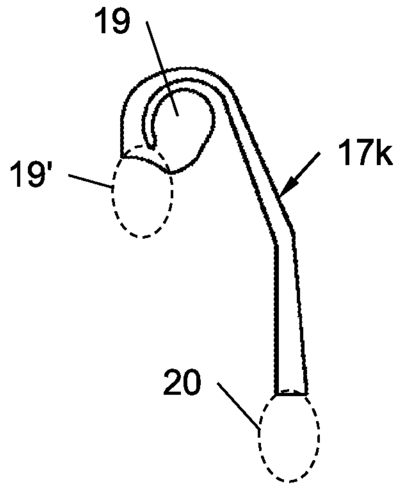
FIG. 20 shows a top view of another arm with variations of contact pads.

In the examples of FIGS. 17 to 19, the arms 17*a*, 17*b* have the shape of a meander. This is no necessary condition, and the arms 17*a*, 17*b* may also be shaped differently. FIG. 20 shows an example of an arm 17*k*, which has just one bow or which is shaped like a bow when viewed into a direction parallel to the coil axis A. It should be noted at this point that the bow is not necessarily "round," but may also comprise, be made up or be approximated by straight segments as this is the case in FIG. 20. In this example a round bow is adjacent to a straight segment, but there is also a corner between said straight segment and another segment. In other words, the term "bow" is to be interpreted widely in this disclosure. It should be noted that length or angle of the bow can also be lower and so the arm 17*k* can be more shaped like an "L" when viewed into a direction parallel to the coil axis A.

The technical teaching, which has been disclosed above in the context of FIGS. 17 to 19. equally applies to the example shown in FIG. 20, in particular in view of the existence and arrangement of contacting pads 19, 19' and 20, in view of the mechanical and/or electrical function of the parts of the arm 17*b* and in view of the arm bridge 21. In particular, a contacting pad 19, 19' and 20 can be arranged within the bow or within the corner of an L-shape.

Figure 21:
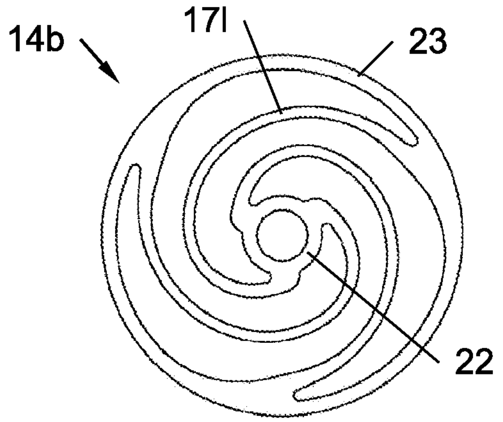
FIGS. 21 to 29 show various embodiments of springs in top view.
Figure 22:
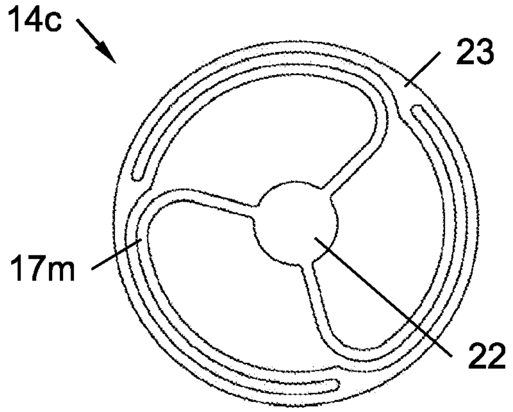
Figure 23:
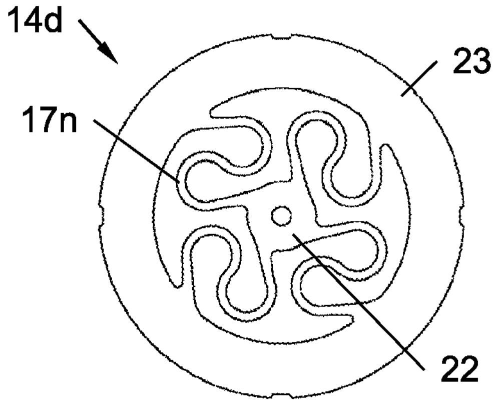
Figure 24:
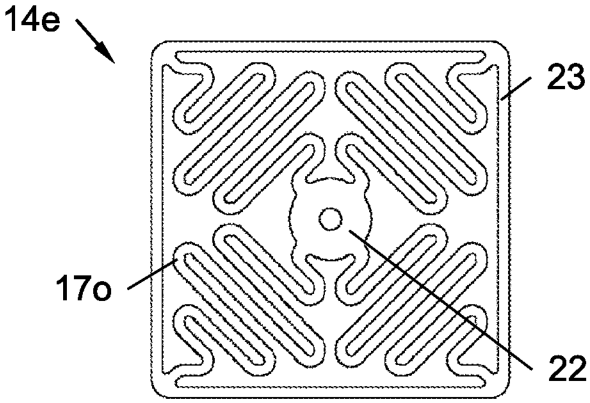
Figure 25:
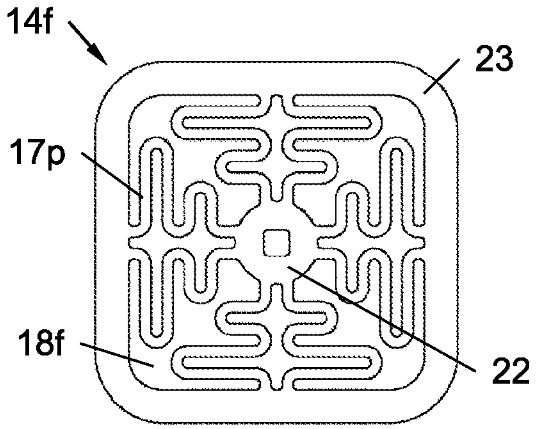
Figure 26:
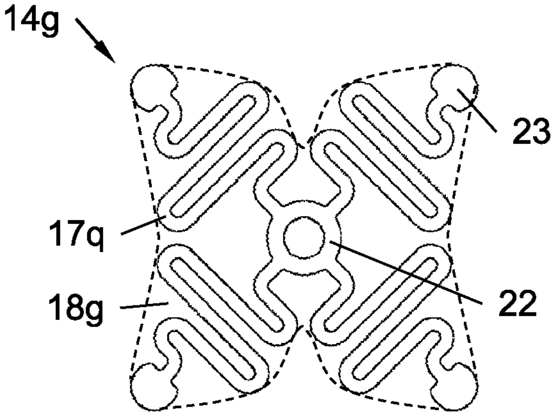

FIGS. 21 to 29 show further various embodiments of arm arrangements 14*b* . . . 14*j* with different kind of arms 17*l* . . . 17*t*, which can be used instead of the arm arrangements 14*a* and the arms 17*a* . . . 17*k* in the embodiments disclosed hereinbefore. Each of the arm arrangement 14*b* . . . 14*j* comprises a center holder 22 and one or more outer holders 23. In detail, FIGS. 21 and 22 show arm arrangements 14*b*, 14*c* with exemplary alternative bow-shaped, spiral arms 17*l*, 17*m*. FIGS. 23 to 26 show various arm arrangements 14*d* . . . 14*g* with arms 17*n* . . . 17*q*, which are shaped like a meander in top view. In addition, FIGS. 25 and 26 show arm arrangements 14*f*, 14*g* with arms 17*p*, 17*q*, which are embedded in a damping material 18*f*, 18*g*. In the embodiment of FIG. 25, the outer holder 23 may act as a natural border for the damping material 18*f*. In FIG. 26, the dashed line indicates a possible border of the damping material 18*g*. It should be noted, that although only the arm arrangements 14*f*, 14*g* are shown with a damping material 18*f*, 18*g*, also the other embodiments of FIGS. 21 to 29 may be equipped with such a damping material 18*f*, 18*g*. For embodiments with an outer holder 23, the same may act as a natural border for the damping material 18*f* again.

Figure 27:
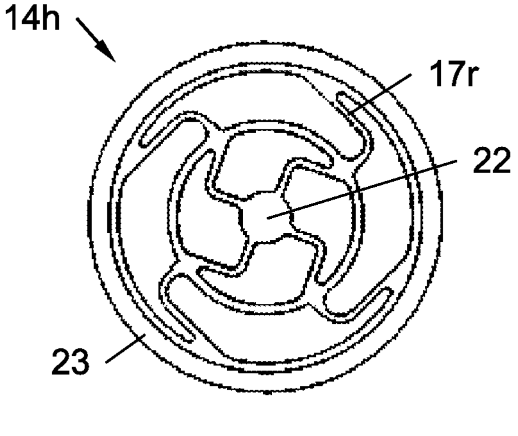
Figure 28:
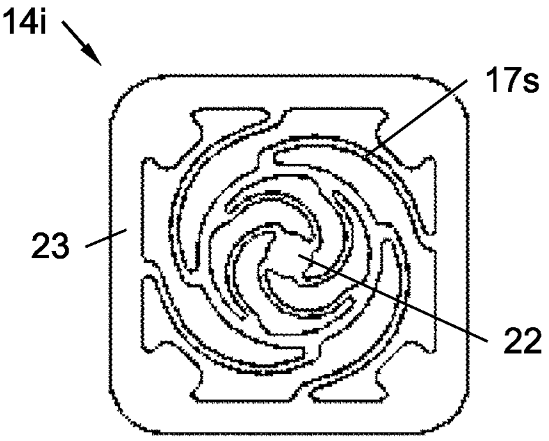
Figure 29:
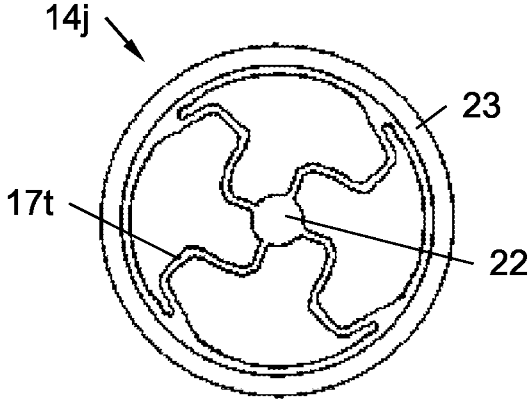

FIGS. 27 to 29 moreover show various arm arrangements 14*h* . . . 14*j* with arms 17*r* . . . 17*t*, which change their winding direction. Accordingly, the arm arrangements 14*h* . . . 14*j* can be seen as being made of two nested spiral arrangements each, which have opposite winding directions. Accordingly, a rotation between the outer holder 23 and the center holder 22 and thus between the magnet system 8 and the coil arrangement 6 upon an excursion of the coil arrangement 6 can be avoided or at least limited. In the embodiments of FIGS. 21 to 25 and 27 to 29 there are annular outer holders 23 surrounding the arms 17*l* . . . 17*p*, 17*r* . . . 17*t*, whereas in the embodiment of FIG. 26 separate outer holders 23 on the end of each of arm 17*q* are used.

Beneficially, the arm arrangements 14*a* . . . 14*j* and in particular the gap between arm sections s . . . s2 can be made by etching and/or by use of a laser (e.g. by use of a femtolaser). In this way, the arm arrangements 14*a* . . . 14*j* and the gaps can be manufactured with high accuracy despite the structures may be very fine.

Figure 30:
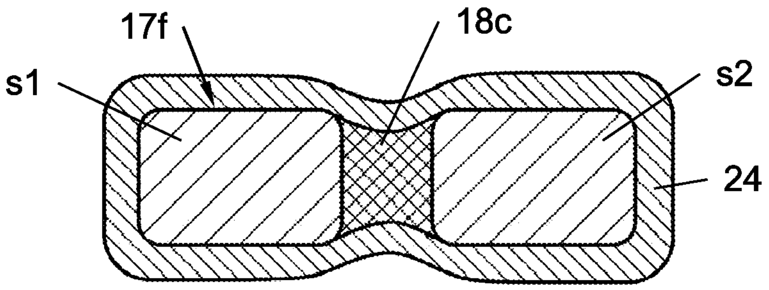
FIG. 30 shows an exemplary cross section through an arm, wherein the arrangement formed by the arm and the damping material is coated with a separate coating material.

FIG. 30 now shows an exemplary cross section through an arm, for example through the arm 17*f* of FIG. 11. Here, the arrangement formed by the arm 17*f* and the damping material 18*c* is coated by a coating material 24, for example, a polymer (e.g. thermoplastics, thermosetting plastic, elastomer, rubber). In this way, non-oxidation resistant materials can be protected from oxidation.

Figure 31:
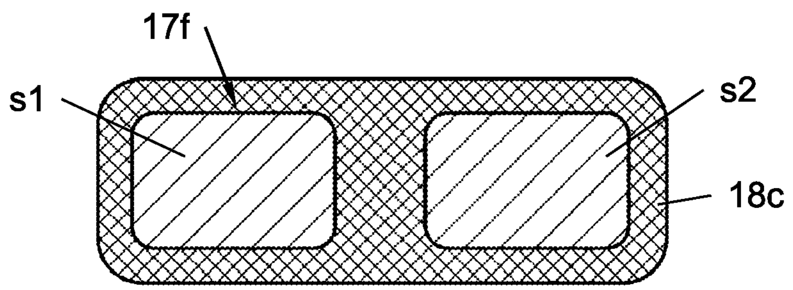
FIG. 31 shows an exemplary cross section through an arm, wherein the damping material both provides the damping and a coating.

FIG. 31 is similar to FIG. 30, but in contrast, instead of a separate coating material 24, the damping material 18*c* is used to both provide the damping and the coating. Connection of the arm sections s1, s2 as well as coating the same can take place in one and the same process. However, in principle it is also possible that in a first step the arm 17*f* is coated with the damping material 18*c* and in a second step the coated arm sections s1, s2 are connected with the damping material 18*c*. In particular, the coating on the arm sections s1, s2 may act as a bonding agent in this case.

It is also possible that the arm 17*f* first is coated with a coating material 24 and then the coated arm sections s1, s2 of the arm 17*f* are connected by the damping material 18*c*. In this case, the coating material 24 on the arm sections s1, s2 may act as a bonding agent as well.

It should be noted that further coating layers can be applied to the structures shown in FIGS. 30 and 31. In particular, the arm 17*f* or its arm sections s1, s2 may be coated with a metal.

In particular, the coating can consist of or contain sprayed silicone. More particularly, silicone can act as a damping material. So, silicone can take the role of the coating material 24 and/or the damping material 18*c* in the above FIGS. 31 and 32.

In a favorable embodiment, a method of manufacturing an intermediate product for an electrodynamic actuator 1*a* comprises the following steps:

a) providing at least one voice coil 7*a*, 7*b*, which has an electrical conductor in the shape of loops running around a coil axis A in a loop section,
b) providing a magnet system 8, which is designed to generate a magnetic field B transverse to the conductor in the loop section, and
c) manufacturing an arm arrangement 14*a* . . . 14*j* of a plurality of arms 17*a* . . . 17*t*.

As already disclosed hereinbefore, the arms 17*a* . . . 17*t* are made of a metal with a fatigue strength of at least 370 $N/mm^2$ or an ultimate tensile strength of at least 1100 $N/mm^2$ and the arms 17*a* . . . 17*t* are L-shaped, U-shaped, S-shaped, shaped like a bow or shaped like a meander when viewed into a direction parallel to the coil axis A.

In a next step, at least one of the plurality of arms 17*a* . . . 17*t* is embedded in silicone, which is sprayed onto the at least one of the plurality of arms 17*a* . . . 17*t* and which forms a damping material 18*c* for the at least one of the plurality of arms 17*a* . . . 17*t*.

Finally, the at least one voice coil 7*a*, 7*b* and the magnet system 8 are coupled by use of the arm arrangement 14*a* . . . 14*j* allowing a relative movement between the voice coil 7*a*, 7*b* and said magnet system 8 in an excursion direction C parallel to the coil axis A.

Figure 33:
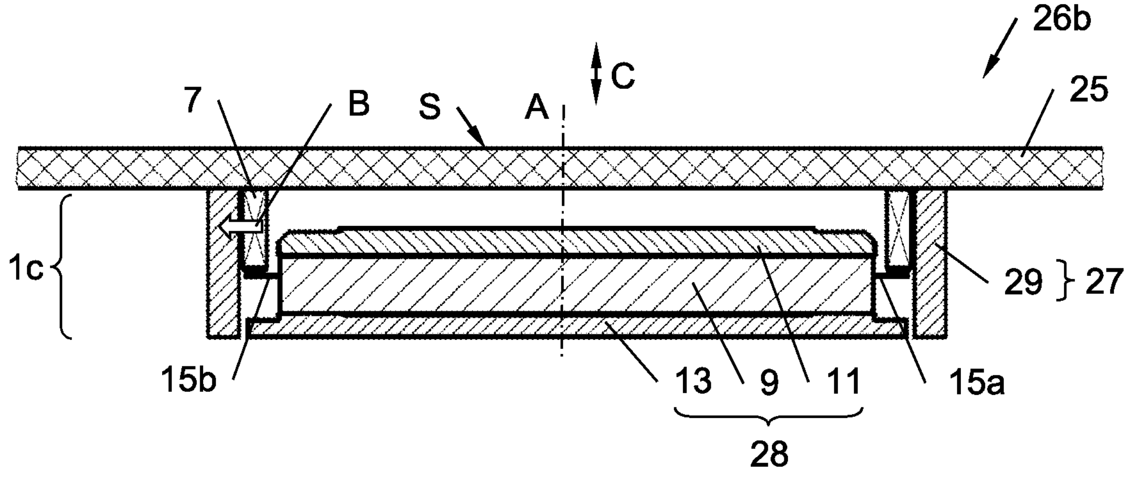
FIG. 33 shows an electrodynamic transducer like in FIG. 32 but with a two-part magnet system.

Alternatively, the at least one voice coil 7*a*, 7*b* is coupled to a movable part 37 of the magnet system 8 by use of the arm arrangement 14*a* . . . 14*j* allowing a relative movement between the voice coil 7*a*, 7*b* and said movable part 37 of the magnet system 8 in an excursion direction C parallel to the coil axis A (see also FIG. 33 in this context).

Spraying silicone in particular qualifies for high production speeds and thus for application in the production of electrodynamic actuators 1*a* with high volumes. For example, the liquid silicone may be pressed out of one or more nozzles for the manufacturing process of the embedded arm arrangement 14*a* . . . 14*j*. It should also be noted that the intermediate product at least comprises the parts indicated above but can comprise more parts of an electrodynamic actuator 1*a* as the case may be, for example, a frame 16 or a housing.

In general and applicable to all examples of FIGS. 1 to 31 it is advantageous if the metal arm 17*a* . . . 17*t* is made of or comprises steel, brass, bronze, molybdenum or tungsten. In this way, the metal arm 17*a* . . . 17*t* is comparably robust and can withstand the comparably high alternating mechanical load, which is caused by an excursion of the electrodynamic actuator 1*a* (i.e. by a relative movement between the coil arrangement 6 and the magnet system 8). This is particularly true if the metal arm 17*a* . . . 17*t* is made of a stainless steel, which makes the metal arm 17*a* . . . 17*t* comparably robust. In a very advantageous embodiment, the metal arm 17*a* . . . 17*t* is made of a cold-rolled stainless steel with a fatigue strength in a range of 370 to 670 $N/mm^2$ or an ultimate tensile strength in a range of 1100 to 2000 $N/mm^2$. Beneficially, austenitic stainless steel can be used for the metal arm 17*a* . . . 17*t*, in particular stainless steel 1.4404. During evaluations this material turned out to particularly fit well to the demands in actuator design. Austenitic stainless steels have a high share of austenite and as such are non-ferromagnetic or low-ferromagnetic. Accordingly no or just low (unwanted) forces are induced into the metal arm 17*a* . . . 17*t* when it moves in the magnetic field in the air gap of the magnet system 8. Such forces could shift the (dynamic) idle position of the electrodynamic actuator 1*a* and deteriorate its characteristics. Moreover, austenitic stainless steel does not or does not substantially magnetically bridge the air gap of the magnet system 8. In other words, a metal arm 17*a* . . . 17*t* does not form a magnetic short circuit in the magnet system 8. Furthermore, stainless steel, in addition to its characteristics presented before, provides the advantage that it is resistant against oxidation.

Figure 32:
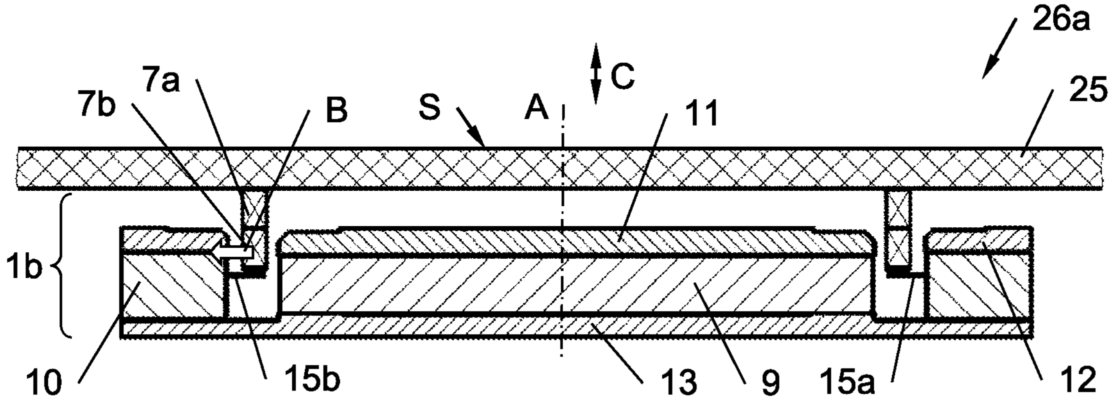
FIG. 32 shows cross section through a first example of an electrodynamic transducer formed by an electromagnetic actuator connected to plate.

In the examples shown in FIGS. 1 to 7, the electromagnetic actuator 1*a* is connected to a membrane 2 thus forming a speaker 5. This however is no necessary condition, but an electromagnetic actuator 1*b*, 1*c* can also be connected to a plate like structure 25 like this is shown in FIGS. 32 and 33. In this way, electrodynamic transducers 26*a*, 26*b* are formed. In detail, the plate like structure 25 comprises a sound emanating surface S and a backside opposite to the sound emanating surface S. The electrodynamic actuator 1*b*, 1*c* is connected to its backside. For this reason, the coil arrangement 6 or the magnet system 8 can comprise a flat mounting surface, which is intended to be connected to the backside of the plate like structure 25, wherein said backside is oriented perpendicularly to the coil axis A.

FIG. 32 shows a first example of such an electrodynamic transducer 26*a*. In fact, the electromagnetic actuator 1*b* looks very much like the electromagnetic actuator 1*a*, which is used for the speaker 5. In contrast, the magnet system 8 is not connected to the plate like structure 25, but it may freely move in relation to the coil arrangement 6. In the example of FIG. 32 a frame 16 is omitted. Nonetheless, the electrodynamic transducer 25*a* can also comprise a frame 16 as the case may be.

FIG. 33 shows an example of an electrodynamic transducer 26*b*, which is similar to the electrodynamic transducer 26*a* of FIG. 32. The main difference is that the magnet system 8 comprises a fixed part 27 and a movable part 28. The fixed part 27 in this example is formed by an outer ring 29 from soft iron, and the movable part 28 is formed by the center magnet 9, the center top plate 11 and the bottom plate 13. Another difference is that there is just one voice coil 7 instead of two. Finally, the arm sub arrangements 15*a*, 15*b* are arranged on the inner side of the voice coil 7 and connect the same to the movable part 28 of the magnet system 8. Thus the movable part 28 may freely move relative to the voice coil 7.

In general, as said, an electromagnetic actuator 1*b*, 1*c* together with the plate like structure 25 forms an electrodynamic transducer 26*a*, 26*b*. For example, the plate like structure can be a passive structure, for example a part of a housing of a device, which the electromagnetic actuator 1*b*, 1*c* is built into. However, the plate like structure can also have a special function itself. For example, if the plate like structure 25 can be embodied as a display, the electrodynamic actuator 1*b*, 1*c* together with the display forms an output device (for both audio and video data).

In contrast to a membrane 2, a plate like structure 25 in the sense of this disclosure has no dedicated flexible part like the membrane 2 has. Accordingly, there is no extreme separation of deflection and piston movement like it is the case for the flexible membrane part 3 (deflection) and a rigid membrane part 4 (piston movement). Instead, sound generation is done via deflection of the whole plate like structure 25. When a plate like structure 25 is used, moreover either the coil arrangement 6 or the magnet system 8 (or at least a part thereof) is connected to the plate like structure 25 or fixedly arranged in relation to the plate like structure 25. A force applied to the plate like structure 25 may be generated by the inertia of the part of the electrodynamic actuator 1*b*, 1*c* which is moved in relation to the plate like structure 25 (which is the magnet system 8 in case of FIG. 32 and the movable part 25 of the magnet system 8 in case of FIG. 33) or because the part of the electrodynamic actuator 1*b*, 1*c* which is moved in relation to the plate like structure 25 is fixed to another part (e.g. to a housing of a device, which the electrodynamic actuator 1*b*, 1*c* is built into).

It should also be noted that an arm arrangement 14*a* . . . 14*j* can be seen as a spring arrangement in case that the electrodynamic actuator 1*b*, 1*c* is connected to a backside of a plate like structure 25 and can be seen as a suspension system in case that the electrodynamic actuator 1*a* is connected to a backside of a membrane 2.

The proposed measures particular relate to "small" speakers 5. Small speakers in the context of this disclosure generally are speakers 5 with a membrane 2, which has an area of less than 600 $mm^2$ when viewed in a direction parallel to the coil axis A and/or speakers 5 with a back volume F, which is in a range from 200 $mm^3$ to 2 $cm^3$. The back volume F generally is the volume "behind" the membrane 2 and may be the volume enclosed by a housing of the speaker 5, enclosed by other parts of the speaker 5 or enclosed by a housing of a device, which the speaker 5 is built into (e.g. a mobile phone).

In general, a speaker 5 or an electrodynamic transducer 26*a*, 26*b* (or output device) of the kind disclosed hereinbefore produces an average sound pressure level of at least 50 dB_SPL in a frequency range from 100 Hz to 15 kHz measured in an orthogonal distance of 10 cm from the sound emanating surface S. In particular, the above average sound pressure level is measured at 1 W electrical power more particularly at the nominal impedance.

It should be noted that the invention is not limited to the above-mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present invention. The scope of the present invention is defined by the appended claims, including known equivalents and unforeseeable equivalents at the time of filing of this application. Although numerous embodiments of this invention have been described above with a certain degree of particularity, those skilled in the art could make numerous alterations to the disclosed embodiments without departing from the spirit or scope of this disclosure.

It should also be noted that the Figs. are not necessarily drawn to scale and the depicted parts may be larger or smaller in reality.

LIST OF REFERENCES

1*a* . . . 1*c* electrodynamic actuator
membrane
3 flexible membrane part
4 rigid membrane part
5 speaker
6 coil arrangement
7, 7*a*, 7*b* voice coil
8 magnet system
9 center magnet
10 . . . 10*d* outer magnet
11 center top plate
12 outer top plate
13 bottom plate
14*a* . . . 14*j* arm arrangement
15*a*, 15*b* arm sub arrangement
16 frame
17*a* . . . 17*t* arm
18*a* . . . 18*g* damping material (e.g. bridge or drop)
19, 19' inner contacting pad
20 outer contacting pad
21 arm bridge
22 center holder
23 outer holder
24 coating material
25 plate like structure (display)
26*a*, 26*b* electrodynamic transducer
27 fixed part of magnet system
28 movable part of magnet system
29 outer ring
A coil axis
B magnetic field
C excursion direction
F back volume
S sound emanating surface
b1 . . . b4 distance between connected arm sections
s, s1, s2 arm section

What is claimed is:

1. An electrodynamic actuator (1*a* . . . 1*c*), which is designed to be connected to a backside of a plate like structure (25) or membrane (2) opposite to a sound emanating surface (S) of the plate like structure (25) or the membrane (2) and which comprises at least one voice coil (7, 7*a*, 7*b*), which has an electrical conductor in the shape of loops running around a coil axis (A) in a loop section;

a magnet system (8) being designed to generate a magnetic field (B) transverse to the conductor in the loop section; and an arm arrangement (14*a* . . . 14*j*) of a plurality of arms (17*a* . . . 17*t*) coupling the at least one voice coil (7, 7*a*, 7*b*) and a) the magnet system (8) and allowing a relative movement between the voice coil (7, 7*a*, 7*b*) and said magnet system (8) in an excursion direction (C) parallel to the coil axis (A); or b) a movable part (28) of the magnet system (8) and allowing a relative movement between the voice coil (7, 7a, 7b) and said movable part (28) of the magnet system (8) in an excursion direction (C) parallel to the coil axis (A), wherein the arms (17a . . . 17t) are made of a metal with a fatigue strength of at least 370 N/mm$^2$ or an ultimate tensile strength of at least 1100 N/mm$^2$ and wherein each of the arms (17a . . . 17t) comprises at least two arm sections (s, s1, s2), which are arranged movable to each other and which are connected to each other by means of a damping material (18a . . . 18g) with a tensile storage modulus of 0.1-6000 MPa and a tensile loss factor of at least 0.1, each measured at room temperature of 20° C.

2. The electrodynamic actuator (1a . . . 1c) as claimed in claim 1, characterized in that the arms (17a . . . 17t) comprise more than two arm sections (s, s1, s2), wherein each two of them are connected to each other by means of the damping material (18a . . . 18g).

3. The electrodynamic actuator (1a . . . 1c) as claimed in claim 1, characterized in that the at least two arm sections (s, s1, s2) run next to each other forming a longitudinal gap in-between, in which the damping material (18a . . . 18g) is arranged.

4. The electrodynamic actuator (1a . . . 1c) as claimed in claim 1, characterized in that a ratio between a length of said gap to its width is >20.

5. The electrodynamic actuator (1a . . . 1c) as claimed in claim 1, characterized in that the at least two arm sections (s, s1, s2) are arranged at a distance (b1 . . . b4) measured in the direction of the coil axis (A).

6. The electrodynamic actuator (1a . . . 1c) as claimed in claim 5, characterized in that the distance (b1 . . . b4) between the at least two arm sections (s, s1, s2) being connected by means of the damping material (18a . . . 18g) is in a range of 5 μm≤d≤100 μm.

7. The electrodynamic actuator (1a . . . 1c) as claimed in claim 1, characterized in that the at least two arm sections (s, s1, s2) are arranged at a distance (b1 . . . b4) measured perpendicularly to the direction of the coil axis (A).

8. The electrodynamic actuator (1a . . . 1c) as claimed in claim 7, characterized in that the distance (b1 . . . b4) between the at least two arm sections (s, s1, s2) being connected by means of the damping material (18a . . . 18g) is in a range of 20 μm≤d≤100 μm.

9. The electrodynamic actuator (1a . . . 1c) as claimed in claim 1, characterized in that the gap is made by etching and/or by use of a laser.

10. The electrodynamic actuator (1a . . . 1c) as claimed in claim 1, characterized in that the arms (17a . . . 17t) are L-shaped, U-shaped, S-shaped, shaped like a bow or shaped like a meander when viewed in a direction parallel to the coil axis (A).

11. The electrodynamic actuator (1a . . . 1c) as claimed in claim 10, characterized in that the at least two arm sections (s, s1, s2) are concatenated in a longitudinal direction of the respective arm (17a . . . 17t) and alternatingly are bent in a different sense of direction or alternatingly are straight and bent.

12. The electrodynamic actuator (1a . . . 1c) as claimed in claim 11, characterized in that a distance (b1 . . . b4) between the at least two arm sections (s, s1, s2) being connected by means of a damping material (18a . . . 18g), which is measured perpendicularly to the direction of the coil axis (A), is in a range of 50 μm≤d≤400 μm.

13. The electrodynamic actuator (1a . . . 1c) as claimed in claim 1, characterized in that the at least two arm sections (s, s1, s2) consist of different materials.

14. The electrodynamic actuator (1a . . . 1c) as claimed in claim 1, characterized in that the arms (17a . . . 17t) are coated.

15. The electrodynamic actuator (1a . . . 1c) as claimed in claim 1, characterized in that the arms (17a . . . 17t) are coated with the damping material (18a . . . 18g).

16. The electrodynamic actuator (1a . . . 1c) as claimed in claim 10, characterized in that the at least one of the plurality of arms (17a . . . 17t) is encompassed by or embedded in the damping material (18a . . . 18g).

17. The electrodynamic actuator (1a . . . 1c) as claimed in claim 16, characterized in that a thickness of the damping material (18a . . . 18g), which is measured in the direction of the coil axis (A), is in a range of 20 μm≤d≤200 μm.

18. The electrodynamic actuator (1a . . . 1c) as claimed in claim 14, characterized in that the coating consist of or contains sprayed silicone.

19. The electrodynamic actuator (1a . . . 1c) as claimed in claim 1, characterized in that the arms (17a . . . 17t) together with the damping material (18a . . . 18g) are coated.

20. The electrodynamic actuator (1a . . . 1c) as claimed in claim 1, characterized in that the at least two arm sections (s, s1, s2) have a different stiffness.

21. The electrodynamic actuator (1a . . . 1c) as claimed in claim 1, characterized in that the arms (17a . . . 17t) are made of or comprise steel, brass, bronze, molybdenum or tungsten.

22. The electrodynamic actuator (1a . . . 1c) as claimed in claim 21, characterized in that the arms (17a . . . 17t) are made of a stainless steel.

23. The electrodynamic actuator (1a . . . 1c) as claimed in claim 22, characterized in that the arms (17a . . . 17t) are made of a cold-rolled stainless steel with a fatigue strength in a range of 370 to 670 N/mm$^2$ or an ultimate tensile strength in a range of 1100 to 2000 N/mm$^2$.

24. The electrodynamic actuator (1a . . . 1c) as claimed in claim 1, characterized in that at least some of said arms (17a . . . 17t) are electrically connected to the at least one voice coil (7, 7a, 7b).

25. A speaker (5), characterized by an electrodynamic actuator (1a . . . 1c) as claimed in claim 1 and a membrane (2), which is fixed to the at least one coil (7, 7a, 7b) and to the magnet system (8).

26. The electrodynamic actuator (1a . . . 1c) as claimed in to claim 1, wherein the at least one voice coil (7, 7a, 7b) or the magnet system (8) comprises a flat mounting surface, which is intended to be connected to the backside of the plate like structure (25) opposite to a sound emanating surface (S) of the plate like structure (25), wherein said backside is oriented perpendicularly to the coil axis (A).

27. An electrodynamic transducer (26a, 26b), comprising a plate like structure (25) with a sound emanating surface (S) and a backside opposite to the sound emanating surface (S) and comprising an electrodynamic actuator (1a . . . 1c) connected to said backside, characterized in that the electrodynamic actuator (1a . . . 1c) is designed according to claim 1.

28. An electrodynamic transducer (26a, 26b) as claimed in claim 27 characterized in that an average sound pressure level of the electrodynamic transducer (26a, 26b) measured in an orthogonal distance of 10 cm from the sound emanating surface (S) is at least 50 dB_SPL in a frequency range from 100 Hz to 15 kHz.

29. An output device characterized in that the plate like structure (25) as claimed in claim 27 is embodied as a display and that the electrodynamic actuator (1*a* . . . 1*c*) is connected to the backside of the display.

30. A method of manufacturing an intermediate product for an electrodynamic actuator (1*a* . . . 1*c*), comprising the steps of:

providing at least one voice coil (7, 7*a*, 7*b*), which has an electrical conductor in the shape of loops running around a coil axis (A) in a loop section;

providing a magnet system (8), which is designed to generate a magnetic field (B) transverse to the conductor in the loop section;

manufacturing an arm arrangement (14*a* . . . 14*j*) of a plurality of arms (17*a* . . . 17*t*), wherein the arms (17*a* . . . 17*t*) are made of a metal with a fatigue strength of at least 370 $N/mm^2$ or an ultimate tensile strength of at least 1100 $N/mm^2$ and wherein the arms (17*a* . . . 17*t*) are L-shaped, U-shaped, S-shaped, shaped like a bow or shaped like a meander when viewed into a direction parallel to the coil axis (A), embedding at least one of the plurality of arms (17*a* . . . 17*t*) in silicone, which is sprayed onto the at least one of the plurality of arms (17*a* . . . 17*t*) and which forms a damping material (18*a* . . . 18*g*) for the at least one of the plurality of arms (17*a* . . . 17*t*), and coupling the at least one voice coil (7, 7*a*, 7*b*) and a) the magnet system (8) by use of the arm arrangement (14*a* . . . 14*j*) and allowing a relative movement between the voice coil (7, 7*a*, 7*b*) and said magnet system (8) in an excursion direction (C) parallel to the coil axis (A), or b) a movable part (28) of the magnet system (8) by use of the arm arrangement (14*a* . . . 14*j*) and allowing a relative movement between the voice coil (7, 7*a*, 7*b*) and said movable part (28) of the magnet system (8) in an excursion direction (C) parallel to the coil axis (A).

* * * * *